US012354325B2

(12) United States Patent
Gilbert

(10) Patent No.: US 12,354,325 B2
(45) Date of Patent: Jul. 8, 2025

(54) IMAGE CLASSIFICATION BY CONVOLUTIONAL NEURAL NETWORK USING RADIAL SUMMATION

(71) Applicant: INTERNATIONAL BUSINESS MACHINES CORPORATION, Armonk, NY (US)

(72) Inventor: Sebastien Gilbert, Granby (CA)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 17/456,422

(22) Filed: Nov. 24, 2021

(65) Prior Publication Data

US 2023/0162475 A1 May 25, 2023

(51) Int. Cl.
  *G06V 10/764* (2022.01)
  *G06V 10/82* (2022.01)
  *G06V 10/10* (2022.01)

(52) U.S. Cl.
  CPC ............ *G06V 10/764* (2022.01); *G06V 10/82* (2022.01)

(58) Field of Classification Search
  CPC ........ G06N 3/045; G06N 3/044; G06N 3/047; G06N 3/02; G06N 3/08; G06N 3/084; G06N 3/086; G06N 20/20; G06N 30/27; G06T 19/20; G06T 2207/10004; G06T 3/04; G06V 10/82; G06V 10/44; G06V 10/764; G06V 10/30; G06V 10/762; G06V 2201/07; G06V 40/10; H04N 13/00
  USPC .................................. 706/25; 382/224, 305
  See application file for complete search history.

(56) References Cited

U.S. PATENT DOCUMENTS

| | | | |
|---|---|---|---|
| 10,733,506 B1 * | 8/2020 | Ogale | G06N 3/084 |
| 11,062,454 B1 * | 7/2021 | Cohen | G01S 7/417 |
| 2021/0150230 A1 * | 5/2021 | Smolyanskiy | G06V 10/82 |
| 2022/0230310 A1 * | 7/2022 | Xie | G06T 7/62 |

FOREIGN PATENT DOCUMENTS

| | | | | |
|---|---|---|---|---|
| CN | 108427958 A | * | 8/2018 | .......... G06K 9/6256 |
| IN | 202141011046 A | | 3/2021 | |
| KR | 101820456 B1 | | 1/2018 | |

OTHER PUBLICATIONS

Esteves et al., GRASP Laboratory, University of Pennsylvania. Title: Polar Transformer Networks, in International Conference on Learning Representations, 2018, pp. 1-15. [Online]. Available: https://ar5iv.labs.arxiv.org/html/1709.01889 (Year: 2018).*
Salas et al., "A minimal model for classification of rotated objects with prediction of the angle of rotation", https://www.sciencedirect.com/science/article/abs/pii/S1047320321000250, Feb. 2021, pp. 1-20. (Year: 2021).*
Jiao (Year: 2018).*

(Continued)

*Primary Examiner* — Chad Dickerson
(74) *Attorney, Agent, or Firm* — Anthony Curro

(57) ABSTRACT

A method, a computer program product, and a computer system classify an image with a convolutional neural network. The method receiving an image. The method includes performing a radial summation on the image to generate a radially summed image. The method includes inputting the radially summed image into the CNN to perform an image classification.

17 Claims, 5 Drawing Sheets

(56) References Cited

OTHER PUBLICATIONS

Cecotti et al., "A Radial Neural Convolutional Layer for Multi-oriented Character Recognition", 12th International Conference on Document Analysis and Recognition (ICDAR), https://www.researchgate.net/publication/261127090_A_Radial_Neural_Convolutional_Layer_for_Multi-Oriented_Character_Recognition, 2013, pp. 1-6.

Chidester et al., "Rotation equivariant and invariant neural networks for microscopy image analysis", https://academic.oup.com/bioinformatics/article/35/14/i530/5529148, Bioinformatics, vol. 35, Issue 14, Jul. 2019, pp. i530-i537.

Cohen et al., "Group Equivariant Convolutional Networks", Proceedings of the International Conference on Machine earning (ICML), https://arxiv.org/abs/1602.07576v3?source=post_page, 2016, pp. 1-12.

Graham et al., "Dense Steerable Filter CNNs for Exploiting Rotational Symmetry in Histology Images", https://arxiv.org/abs/2004.03037, Jul. 20, 2020, pp. 1-14.

Kim et al., "CyCNN: A Rotation Invariant CNN using Polar Mapping and Cylindrical Convolution Layers", https://arxiv.org/abs/2007.10588, 2007, pp. 1-10.

Marcos et al., "Learning rotation invariant convolutional filters for texture classification", https://arxiv.org/pdf/1604.06720.pdf, Sep. 21, 2016, pp. 1-6.

Mell et al., "The NIST Definition of Cloud Computing", National Institute of Standards and Technology, Special Publication 800-145, Sep. 2011, pp. 1-7.

Quiroga et al., "Revisiting Data Augmentation for Rotational Invariance in Convolutional Neural Networks", In book: Modelling and Simulation in Management Sciences, https://www.researchgate.net/publication/331838234_Revisiting_Data_Augmentation_for_Rotational_Invariance_in_Convolutional_Neural_Networks Jan. 2020, pp. 1-15.

Salas et al., "Rotation Invariant Networks for Image Classification for HPC and Embedded Systems", MDPI, https://www.mdpi.com/2079-9292/10/2/139, Electronics, 2021, 10, 139, pp. 1-14.

Salas et al., "A minimal model for classification of rotated objects with prediction of the angle of rotation", https://www.sciencedirect.com/science/article/abs/pii/S1047320321000250, 2021, pp. 1-20.

* cited by examiner

IMAGE CLASSIFICATION BY CONVOLUTIONAL NEURAL NETWORK USING RADIAL SUMMATION

BACKGROUND

The exemplary embodiments relate generally to image classification, and more particularly to preprocessing an image with a radial summation to perform an image classification with a convolutional neural network.

The process of image classification entails assigning an input image to one of a defined number of classes. There have been a variety of different approaches to image classification. With advances in machine learning, the convolutional neural network (CNN) has been introduced and has become a substantially successful approach to image classification. The use of the CNN for image classification has been successful for a wide range of image types such as natural scenes, medical images, industrial automated inspection, etc. A central attribute of convolutional neural networks is translation invariance where a given feature may appear anywhere in an image (e.g., up to minor boundary effects), and the convolution layers of the CNN respond locally with the same amplitude (i.e., translation equivariance). This property of CNNs allows for weight sharing of feature detectors (i.e., the convolution kernels), which in turn makes the CNNs data efficient in image classification. In this manner, a feature that is a strong indicator that an image belongs to a given class is not required to always be located at the same place or location to generate a useful signal. However, there is still room for improvement to the use of the CNN in performing image classification.

SUMMARY

The exemplary embodiments disclose a method, a computer program product, and a computer system for classifying an image with a convolutional neural network. The method comprises receiving an image. The method comprises performing a radial summation on the image to generate a radially summed image. The method comprises inputting the radially summed image into the CNN to perform an image classification.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
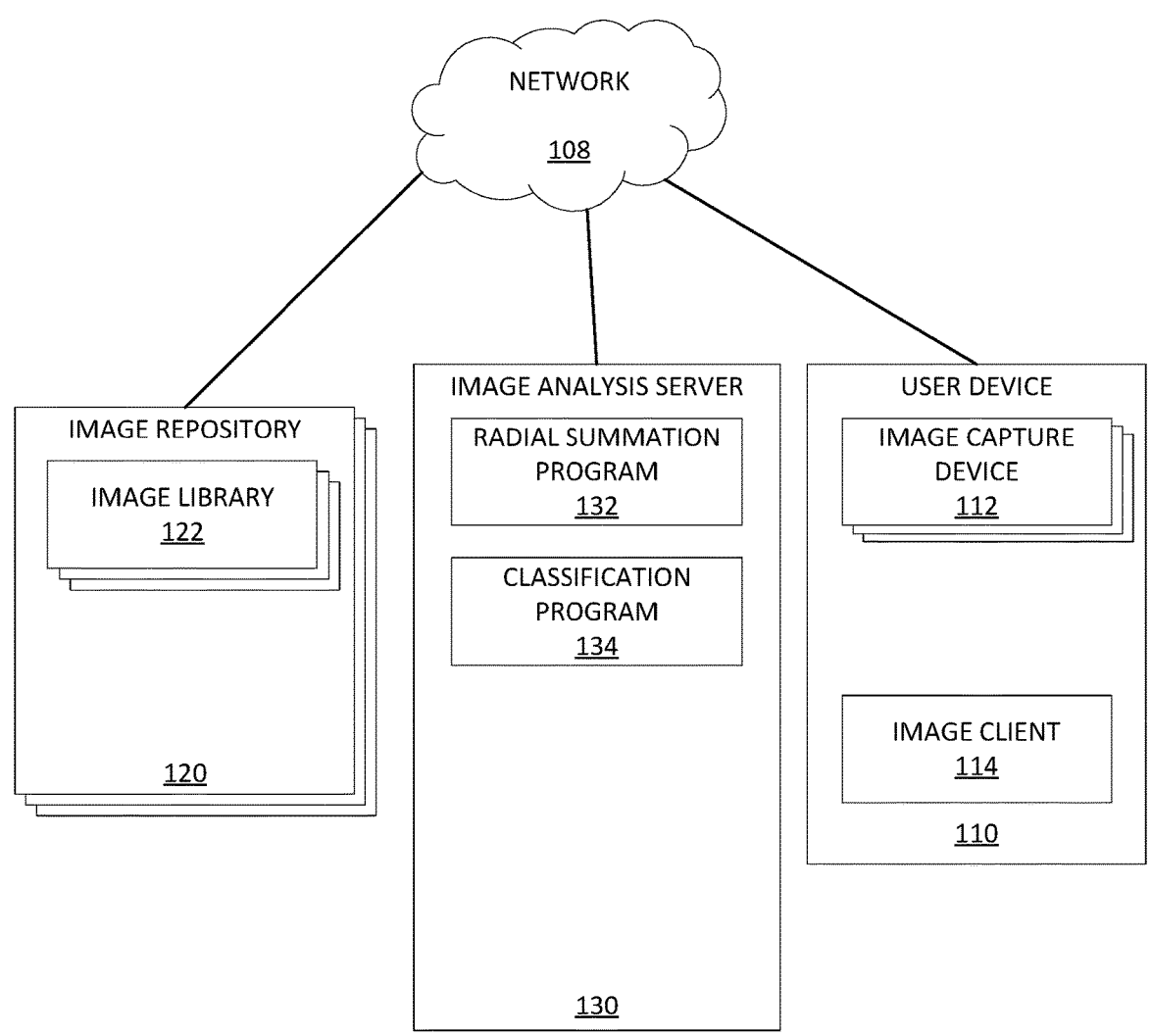
FIG. 1 depicts an exemplary schematic diagram of an image classification system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for performing an image classification with a convolutional neural network (CNN). The exemplary embodiments provide a mechanism in which an image may be preprocessed using a radial summation prior to utilizing the CNN. The mechanism according to the exemplary embodiments may introduce the radial summation to convert the image with two spatial dimensions to a tensor with three spatial dimensions. Key benefits of the exemplary embodiments may include a more accurate manner of performing the image classification from using the CNN to further incorporate the benefits of using the CNN in this process. Detailed implementation of the exemplary embodiments follows.

The use of the CNN in the image classification process includes a variety of different features. For example, the CNN utilizes a translation invariance which is an exemplary desirable type of transformation invariance. In another example, the CNN utilizes a rotation invariance which is another exemplary desirable type of transformation invariance. The feature of rotation invariance is an ability for a classifier to perform equally well at classifying an image in the presence of an arbitrary rotation in an image plane. For example, in microscopic images of biopsies, the objects of interest may appear in any orientation relative to the image axes. As a consequence, the edges and the textures may not have any preferred orientation. For the CNN, the convolution layers are not intrinsically rotation-equivariant. Thus, there is room to improve this feature of the rotation invariance of the CNNs to further improve the overall accuracy of image classification when using the CNN.

Conventional approaches have provided a variety of mechanisms for increasing rotation invariance of the CNNs. The conventional approaches to increase rotation invariance of the CNNs are typically based on data augmentation or specialized convolution layers. With regard to solutions based on data augmentation, a conventional approach may attempt to compensate for the lack of rotation invariance of the CNN. The conventional approach may create rotated copies of the training and validation images in the dataset. By doing so, any given image feature (e.g., edge, corner, texture patch, etc.) may appear multiple times in the augmented dataset through the rotated versions. The CNN subsequently must learn to detect these rotated versions with separate convolution kernels. However, this conventional approach hinders the weight-sharing efficiency of the CNN. With regard to solutions based on specialized convolution layers, a conventional approach may rely on the design of specialized layers that exhibit a level of rotation equivariance. By combining these rotation-equivariant specialized layers with regular convolution layers, the CNN being used for image classification may exhibit an approximate rotation invariance. However, this conventional approach requires layer types that may not be readily available in common deep learning libraries, especially for scaled-down library versions targeting mobile or edge devices.

The exemplary embodiments introduce a radial summation preprocessing operation to the image classification process utilizing the CNN. As will be described in further detail below, the radial summation operation may convert short linear segments in the original image into hotspots. The orientations of the short linear segments may be represented by translations along a three-dimensional spatial dimension, in a radially summed tensor. In this manner, a relatively simple three-dimensional convolution may extract rotated features as if they were translated hotspots. Accordingly, the radial summation according to the exemplary embodiments may maintain an efficiency of using the CNN for image classification as well as being more readily available and more easily incorporated into image classification processes utilizing the CNN.

The exemplary embodiments are described in performing a preprocessing step in the image classification process involving the CNN. However, the particular timing, the use of the CNN, etc. are only for illustrative purposes. As those skilled in the art will understand, the exemplary embodiments may be incorporated in appropriate ways to other image classification processes that may benefit from the results provided by the radial summation. The particular operations involved in the radial summation may also be incorporated in various stages of the image classification process, particularly with the CNN.

The exemplary embodiments are also described with regard to performing the radial summation operation to convert an image with two spatial dimensions to a tensor with three spatial dimensions. However, the use of two spatial dimensions and converting to a tensor with three spatial dimensions is only for illustrative purposes. The exemplary embodiments may also be utilized and/or modified for images with further dimensions and converting the image to include additional dimensions. For example, the exemplary embodiments may perform the radial summation operation to convert an image with three spatial dimensions to a tensor with five spatial dimensions or a tensor with four spatial dimensions if only one plane of rotation is considered. In this manner, the exemplary embodiments may perform the radial summation on an image with N dimensions to convert to a tensor with N+x dimensions where x is greater than 0 and based on further factors (e.g., rotation planes).

FIG. 1 depicts an image classification system 100, in accordance with the exemplary embodiments. According to the exemplary embodiments, the image classification system 100 may include a user device 110, one or more data repositories 120, and an image analysis server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the image classification system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the image classification system 100 that do not utilize the network 108.

In the exemplary embodiments, the user device 110 and the image repository 120 may be a source of an image for which the exemplary embodiments may perform an image classification. As one skilled in the art will understand, image classification may be a process that is utilized for a wide range of applications. Generally, image classification may involve pattern recognition in computer vision environments to classify an image based on contextual information ascertained from processing an image where contextual information may be directed toward analyzing a pixel and its neighboring pixels. In performing image classification, a system may determine a category to assign to an image for subsequent purposes such as image searches. There may be a plurality of sources in which the image analysis system 100 may receive images to perform an image classification.

In this manner, the user device 110 and the image repository 120 may represent any source of an image that requires image classification.

In the exemplary embodiments, the user device 110 may include one or more image capture devices 112 and an image client 114, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the user device 110 is shown as a single device, in other embodiments, the user device 110 may be comprised of a cluster or plurality of computing devices, in a modular manner, etc., working together or working independently. The user device 110 is described in greater detail as a hardware implementation with reference to FIG. 3 (e.g., data processing according to the exemplary embodiments being performed by processor 02), as part of a cloud implementation with reference to FIG. 4 (e.g., the device 110 according to the exemplary embodiments being represented by the laptop computer 54C), and/or as utilizing functional abstraction layers for processing with reference to FIG. 5 (e.g., workload layer 90 including image classification processing 96 according to the exemplary embodiments). The user device 110 may be utilized by a user who is performing a task on a unit or asset in a self guidance manner (e.g., without instruction from another user).

In the exemplary embodiments, the one or more image capture devices 112 may be configured to generate images. For example, the image capture devices 112 may include cameras, imagers, etc. The image capture devices 112 may generate the raw data for the images. In the exemplary embodiments, the results client 116 may act as a client in a client-server relationship and may be a software, hardware, and/or firmware based application capable of formatting the raw data of the images and provide a resulting image file via the network 108. In embodiments, the results client 116 may format the raw data into the image file and provide the image file for further processing as well as interact with one or more components of the image classification system 100, and utilize various wired and/or wireless connection protocols for data transmission and exchange associated with data used for image classification analysis, including Bluetooth, 2.4 ghz and 5 gHz internet, near-field communication, Z-Wave, Zigbee, etc.

In the exemplary embodiments, the data repository 120 may include one or more image libraries 122 that each store a plurality of images available for further processing including image classification and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the data repository 120 is shown as a single device, in other embodiments, the data repository 120 may be comprised of a cluster or plurality of electronic devices, in a modular manner, etc., working together or working independently. While the data repository 120 is also shown as a separate component, in other embodiments, the data repository 120 may be incorporated with one or more of the other components of the image classification system 100. For example, the data repository 120 may be incorporated in the image analysis server 130. Thus, access to the data repository 120 by the image analysis server 130 may be performed locally. The data repository 120 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the image analysis server 130 may include a radial summation program 132 and a classification program 134, and act as a server in a client-server relationship with the image client 114 as well as be in a communicative relationship with the data repository 120. The image analysis server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the image analysis server 130 is shown as a single device, in other embodiments, the image analysis server 130 may be comprised of a cluster or plurality of computing devices, working together or working independently. While the image analysis server 130 is also shown as a separate component, in other embodiments, the operations and features of the image analysis server 130 may be incorporated with one or more of the other components of the image classification system 100. For example, the operations and features of the image analysis server 130 may be incorporated in the user device 110 (e.g., so that the image classification is performed locally on the user device 110). The image analysis server 130 is described in greater detail as a hardware implementation with reference to FIG. 3 (e.g., data processing according to the exemplary embodiments being performed by processor 02), as part of a cloud implementation with reference to FIG. 4 (e.g., the device 110 according to the exemplary embodiments being represented by the desktop computer 54B), and/or as utilizing functional abstraction layers for processing with reference to FIG. 5 (e.g., workload layer 90 including image classification processing 96 according to the exemplary embodiments).

In the exemplary embodiments, the radial summation program 132 may be a software, hardware, and/or firmware application configured to perform the preprocessing step of a radial summation on the image prior to an image classification by a CNN. As will be described in further detail below, the radial summation program 132 may perform the radial summation to convert an image with two spatial dimensions to a tensor with three spatial dimensions that is done independently for each image channel. In this manner, the radial summation program 132 may generate a radially summed image as an output of performing the radial summation on the image.

In the exemplary embodiments, the classification program 134 may be a software, hardware, and/or firmware application configured to receive the radially summed image and perform the image classification using the radially summed image as the input for the CNN whose convolution layers are three-dimensional convolutions. The classification program 134 may incorporate a variety of different operations that are used in image classification including those that one skilled in the art will understand.

Figure 2:
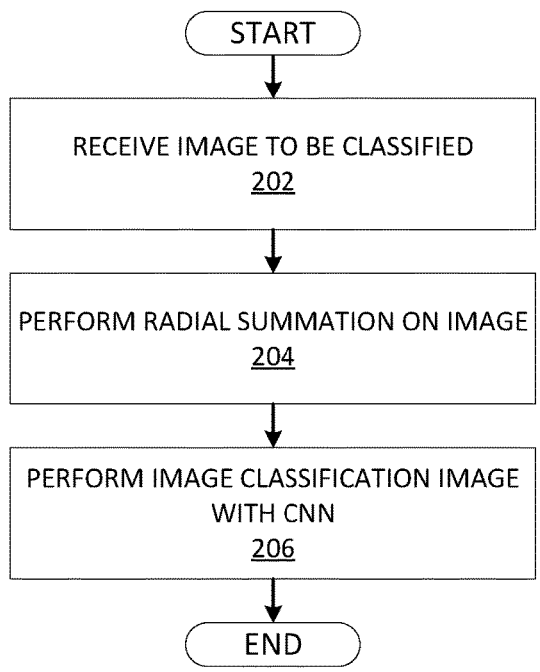
FIG. 2 depicts an exemplary flowchart of a method 200 illustrating the operations of an image analysis server 130 of the image classification system 100 in performing an image classification, in accordance with the exemplary embodiments.

FIG. 2 depicts an exemplary flowchart of a method 200 illustrating the operations of the image analysis server 130 of the image classification system 100 in performing an image classification, in accordance with the exemplary embodiments. The method 200 may relate to operations that are performed by the radial summation program 132 and the classification program 134. The method 200 will be described from the perspective of the image analysis server 130. Accordingly, the method 200 presents an image classification process that incorporates a further operation in which a radial summation is performed to increase an accuracy with which the subsequent operations are done.

The image analysis server 130 may receive an image to be classified (step 202). The image analysis server 130 may receive an image from any source such as the user device 110, the image repository 120, etc. The image analysis server 130 may be configured to perform an image analysis on various types of images. For example, the image may be a single frame image having two spatial dimensions. In another example, the image may be three-dimensional comprising a plurality of single frame images combined to visually be a three-dimensional image. The image analysis server 130 may perform the image analysis on each single frame image having two spatial dimensions. It is again noted that the exemplary embodiments may be extended to images with greater spatial dimensions. For example, the exemplary embodiments may be extended to three dimensional images where the radial summation converts the three dimensional image to a five dimensional image with dimensions (x, y, z, theta, rho), where theta and rho are the longitude and latitude angles in a spherical coordinates system.

The image analysis server 130 may perform a radial summation on the image to generate radially summed image (step 204). As described above, the radial summation may be introduced as a preprocessing step in the image classification process that converts the image with two spatial dimensions (x, y) to a tensor with three spatial dimensions (x, y, θ), where θ is an azimuthal angle. The image analysis server 130 may perform this conversion with the following:

$$I_{RS}(x, y, \theta) = \int_0^\infty \Gamma(r, \theta) I(x + r\cos(\theta), y + r\sin(\theta)) dr \quad \text{(Equation 1)}$$

where $I_{RS}(x, y, \theta)$ is the radially summed image, $\Gamma(r, \theta)$ is a weighting function that is used to control the desired radial and azimuthal invariance, and I(x, y) is the received image. The equivalent equation to Equation 1 for a digital image may be the following:

$$I_{RS}[[c,]k_\theta, y, x] = \sum_{r=0}^{r_{max}} \Gamma[r, k_\theta] I\left[[c,]y + r\sin\left(\frac{2\pi k_\theta}{N_\theta}\right), x + r\cos\left(\frac{2\pi k_\theta}{N_\theta}\right)\right] \quad \text{(Equation 2)}$$

where c is a channel index such as a color channel index, $k_\theta$ is a number of discrete azimuthal angles (e.g., to sum over 16 azimuthal angles (i.e., $N_\theta$=16), $k_\theta$ goes from 0 to 15 such that a corresponding θ is $2\theta k_\theta/N_\theta$ which is the angle that appears inside the sin ( ) and cos ( ) functions), and r is an integer number of pixels over which to sum the grayscale or the colors of the image. It is noted that c is denoted in brackets to illustrate an optional parameter. For example, an image may be a grayscale image that has a single channel and therefore be represented as a tensor of shape [height, width]. As a result of the image being a color image, the image may be represented as a tensor of shape [3, height, width] where c may take the values of 0, 1, 2.

The image analysis server 130 may perform the radial summation independently for each image channel. For example, the received image may have RGB channels. As a result, the image analysis server 130 may create the tensor to have a shape of (3, height, width) and the radially summed image tensor may have a shape of (3, Ne, height, width), where Ne is the chosen number of azimuthal angles. In a particular implementation, for the radial summation for a pixel at coordinates (x, y) with the azimuthal angle θ at −π/4, the variable Γ may be set to 0.25 for r={0, 1, 2, 3}. Accordingly, the radial summation for (x, y, $k_\theta$) may be a uniform average of the pixel values identified in the received image relative to the coordinates (x, y) of the pixel values along a line of 4 pixels starting at (x, y), at an angle of −π/4 radians. The image analysis server 130 may perform the radial summation based on the short linear features in the received image creating hotspots in the radially summed image. A rotation of a short linear feature may translate the corresponding hotspot along the $k_\theta$ axis in the radially summed image.

The image analysis server 130 may perform an image classification on the image using a CNN (step 206). The image analysis server 130 may utilize the radially summed image that created a tensor with three spatial dimensions of (x, y, θ). The radially summed image may then be fed as an input to a CNN whose convolution layers are three-dimensional convolutions. Those skilled in the art will understand the general mechanism of the three-dimensional convolutions which provides a convolution layer implemented by deep learning libraries. For example, the CNN may utilize a stack of three-dimensional convolutions and non-linearities for an output vector including a multilayer perceptron. In an exemplary implementation, the image analysis server 130 may utilize a conventional set of operations involved in image classification with a CNN, except for the input being the radially summed image.

The exemplary embodiments are configured to perform an image classification process utilizing a CNN where an image that is to be classified is preprocessed with a radial summation prior to being input into the CNN classifier. The radial summation augments an image from two spatial dimensions to three spatial dimensions where the third spatial dimension is an azimuthal angle surrounding each pixel. The radial summation performs a weighted sum of radial segments starting from a given pixel, for a set number of azimuthal angles. The radially summed image is then passed to a CNN that performs three-dimensional convolutions.

The mechanism described above in which an image is preprocessed with a radial summation for the image classification enables a greater accuracy in classifying an image with a CNN. As a proof of concept, experiments were done with a dataset of arbitrarily rotated images. The results show that the exemplary embodiments allow a CNN to reach higher test accuracies than similar CNN architectures based on two-dimensional convolutions, for the same number of trainable parameters.

In the experiments, the parameters that were set may have been selected to simulate a fair comparison between the radial summation feature of the exemplary embodiments in which a radially summed image is used by the CNN and a conventional image classification in which an image is directly input in the CNN without radial summation. For example, based on two-dimensional convolutions, the number of trainable parameters for a conventional CNN architecture for image classification may be 208,673. Accordingly, the parameters may be set for the exemplary embodiments in which a CNN architecture with three-dimensional convolutions ingest a radially summed image. Specifically, the number of convolution kernels in the first layer may be selected such that the number of trainable parameters is as close as possible to the equivalent CNN in conventional approaches. In this exemplary implementation, the trainable parameters for the exemplary embodiments may be 207,601.

For each architecture, a series of 50 training runs of 100 epochs were performed in the experiments with random weight initialization. The dataset that was used may consist of grayscale images of randomly rotated handwritten digits with a 28×28 resolution. The train-valid subset may contain 12,000 images and the test subset contains 50,000 images. All the training runs then used the same hyperparameters. In these experiments, the exemplary embodiments consistently showed improved accuracy in the image classification process for the same images.

Figure 3:
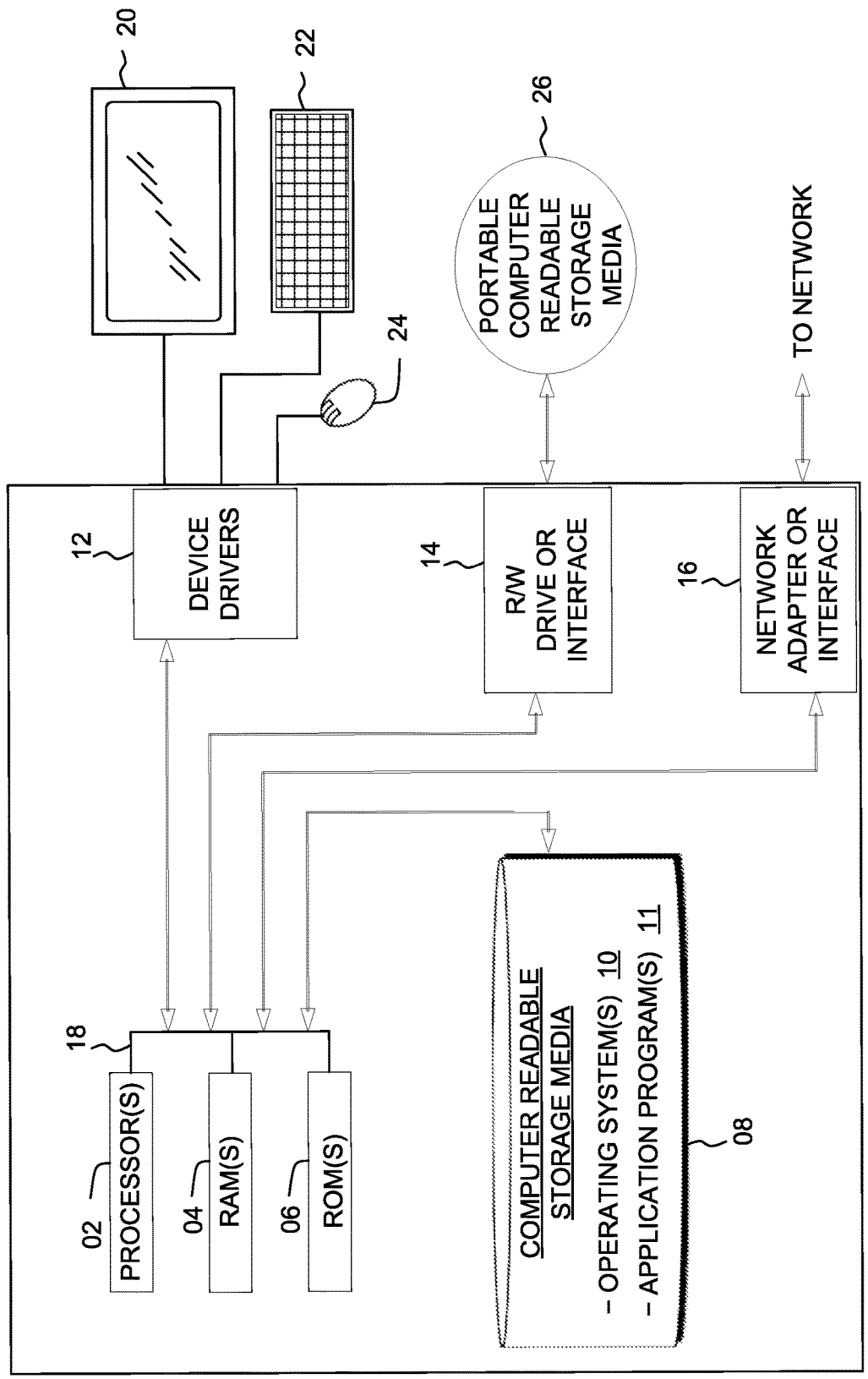
FIG. 3 depicts an exemplary block diagram depicting the hardware components of the image classification system 100 of FIG. 1, in accordance with the exemplary embodiments.

FIG. 3 depicts a block diagram of devices within the image classification system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
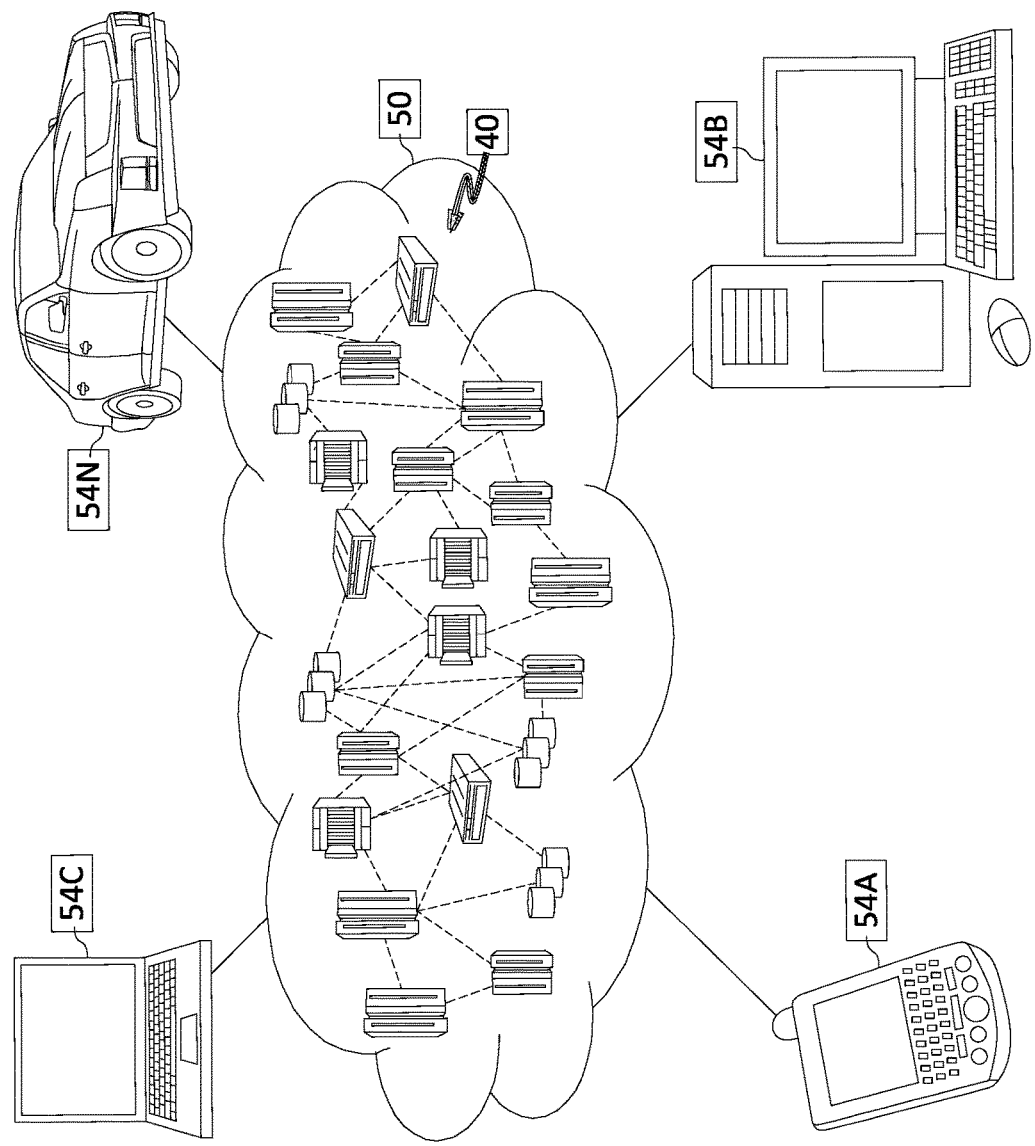
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
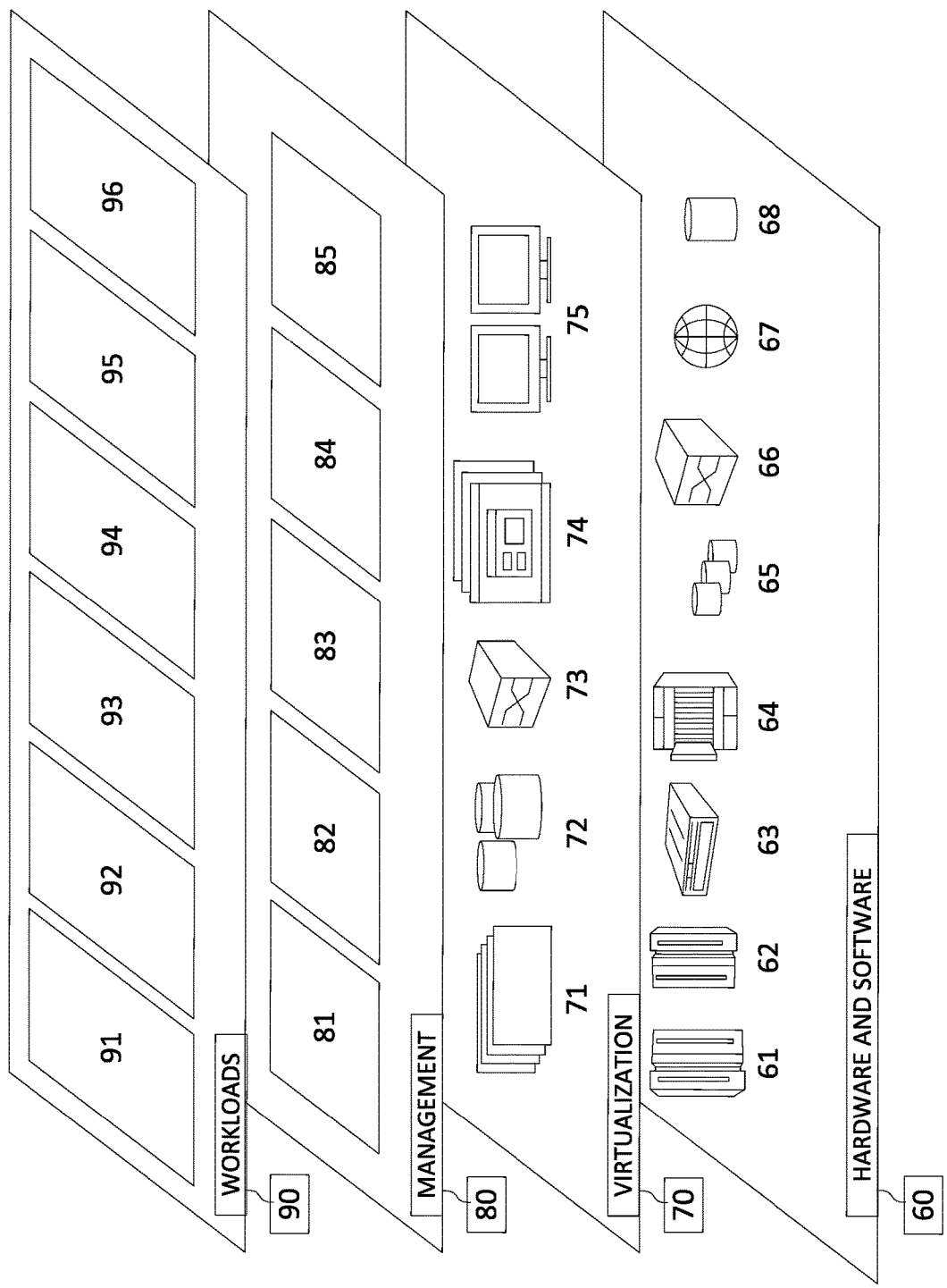
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image classification processing 96.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for classifying an image with a convolutional neural network (CNN) into an image category, the computer-implemented method comprising:
   receiving an image with two spatial dimensions for classification by a convolutional neural network (CNN), the image having an arbitrary rotation in an image plane;

performing a radial summation preprocessing on the image to generate a radially summed image prior to utilizing the CNN for classification, the radial summation converting the image with two spatial dimensions into a tensor with three spatial dimensions without relying upon the CNN to perform the radial summation;

inputting the radially summed image into the CNN to perform an image classification, the image classification classifying the image into an image category; and classifying the radially summed images into the image category with the CNN.

2. The computer-implemented method of claim 1, wherein the three spatial dimensions further includes an azimuthal angle.

3. The computer-implemented method of claim 2, wherein the radial summation comprises:

performing a weighted sum of radial segments starting from a given pixel of the image for a set number of a plurality of the azimuthal angle.

4. The computer-implemented method of claim 1, wherein the radial summation is performed independently for each image channel.

5. The computer-implemented method of claim 1, wherein the CNN performs three-dimensional convolutions on the radially summed image.

6. The computer-implemented method of claim 1, wherein the radial summation comprises:

converting three spatial dimensions of the image to a tensor with one of five spatial dimensions or four spatial dimensions if only one plane of rotation is considered.

7. A non-transitory computer-readable storage media executed by a computer to perform program instructions stored on the non-transitory computer-readable storage media for classifying an image with a convolutional neural network (CNN) into an image category, the non-transitory computer-readable storage media storing the program instructions comprising:

receiving an image with two spatial dimensions for classification by a convolutional neural network (CNN), the image having an arbitrary rotation in an image plane;

performing a radial summation preprocessing on the image to generate a radially summed image prior to utilizing the CNN for classification, the radial summation converting the image with two spatial dimensions into a tensor with three spatial dimensions without relying upon a specialized layer of the CNN to perform the radial summation; and inputting the radially summed image into the CNN to perform an image classification, the image classification classifying the image into an image category; and classifying the radially summed images into the image category with the CNN.

8. The non-transitory computer-readable storage media of claim 7, wherein the three spatial dimensions further includes an azimuthal angle.

9. The non-transitory computer-readable storage media of claim 8, wherein the radial summation comprises:

performing a weighted sum of radial segments starting from a given pixel of the image for a set number of a plurality of the azimuthal angle.

10. The non-transitory computer-readable storage media of claim 7, wherein the radial summation is performed independently for each image channel.

11. The non-transitory computer-readable storage media of claim 7, wherein the CNN performs three-dimensional convolutions on the radially summed image.

12. The non-transitory computer-readable storage media of claim 7, wherein the radial summation comprises:

converting three spatial dimensions of the image to a tensor with one of five spatial dimensions or four spatial dimensions if only one plane of rotation is considered.

13. A computer system for classifying an image with a convolutional neural network (CNN) into an image category, the computer system comprising:

one or more computer processors, one or more computer-readable storage media, and program instructions stored on the one or more of the computer-readable storage media for execution by at least one of the one or more processors capable of performing a method, the method comprising:

receiving an image with two spatial dimensions for classification by a convolutional neural network (CNN) for classification, the image having an arbitrary rotation in an image;

performing a radial summation preprocessing on the image to generate a radially summed image prior to utilizing the CNN, the radial summation converting the image with two spatial dimensions into a tensor with three spatial dimensions without relying upon a specialized layer of the CNN to perform the radial summation; and inputting the radially summed image into the CNN to perform an image classification, the image classification classifying the image into an image category; and classifying the radially summed images into the image category with the CNN.

14. The computer system of claim 13, wherein the three spatial dimensions further includes an azimuthal angle.

15. The computer system of claim 14, wherein the radial summation comprises:

performing a weighted sum of radial segments starting from a given pixel of the image for a set number of a plurality of the azimuthal angle.

16. The computer system of claim 13, wherein the radial summation is performed independently for each image channel.

17. The computer system of claim 13, wherein the CNN performs three-dimensional convolutions on the radially summed image.

* * * * *